March 2, 1948. T. COLLINS 2,437,186
GRATING AND METHOD OF MAKING THE SAME
Filed May 27, 1944 2 Sheets-Sheet 1
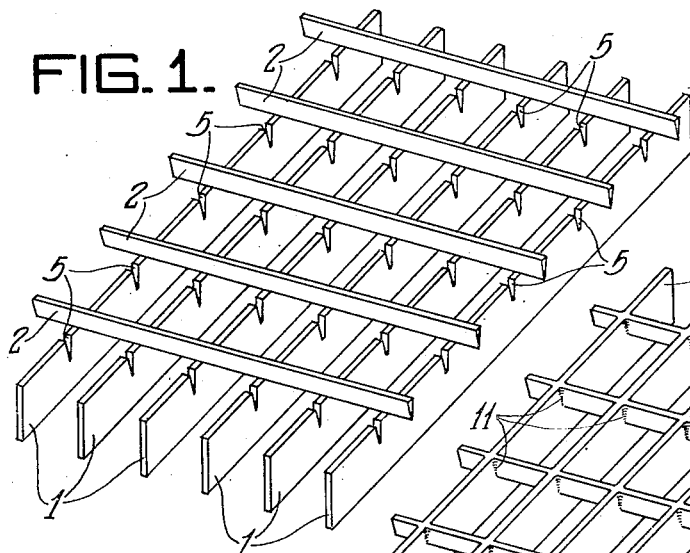
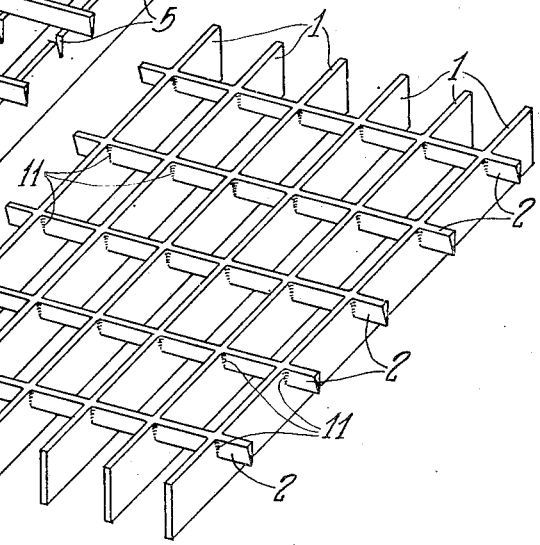
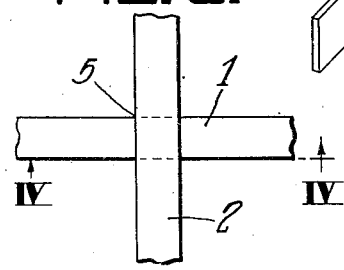
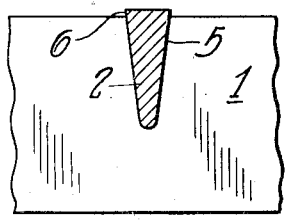
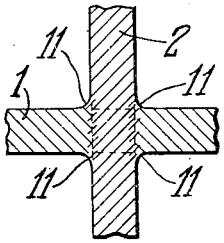
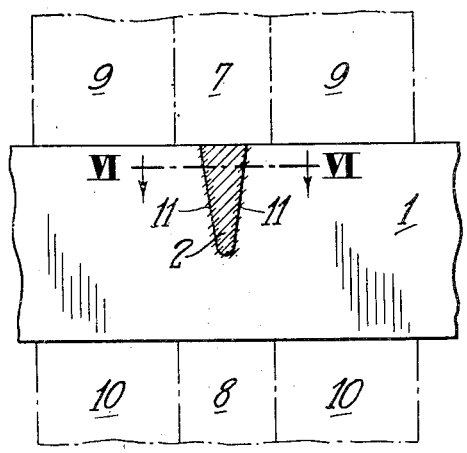
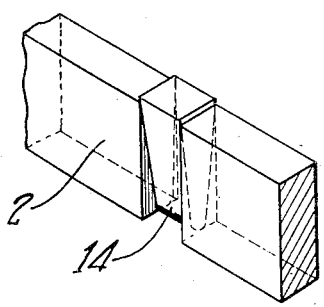
*Inventor:*
TAPPAN COLLINS,
by John E. Jackson
his Attorney.

March 2, 1948. T. COLLINS 2,437,186
GRATING AND METHOD OF MAKING THE SAME
Filed May 27, 1944 2 Sheets-Sheet 2
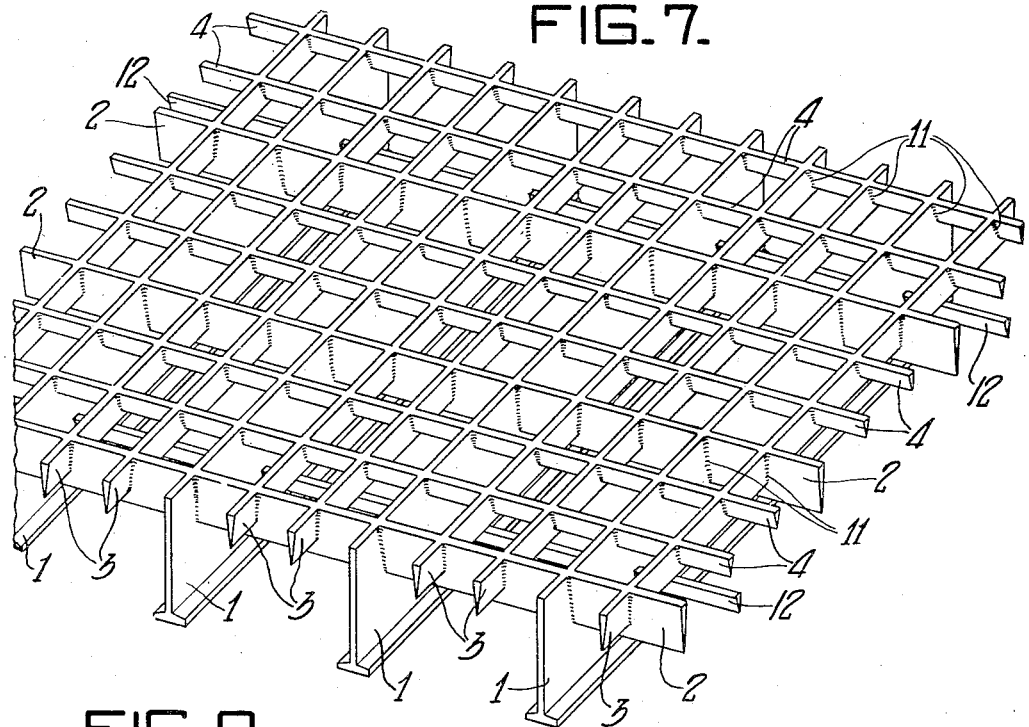
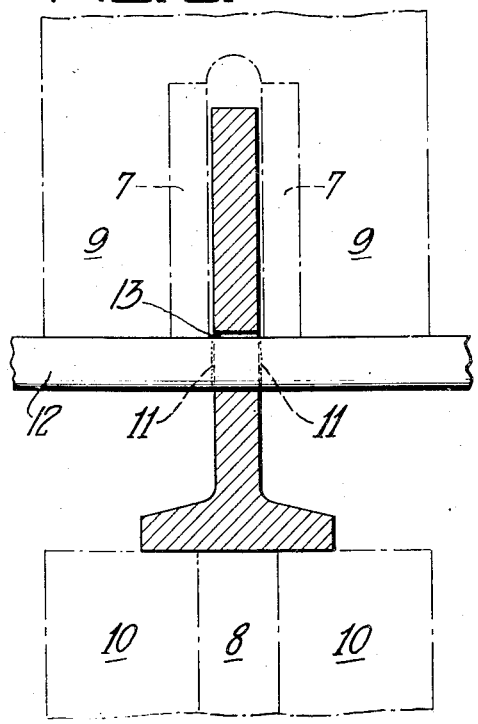
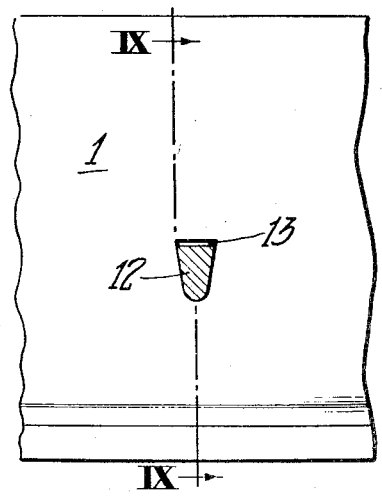
Inventor:
TAPPAN COLLINS,
by John E. Jackson
his Attorney.

Patented Mar. 2, 1948

2,437,186

UNITED STATES PATENT OFFICE 2,437,186

GRATING AND METHOD OF MAKING THE SAME

Tappan Collins, Pittsburgh, Pa., assignor to Carnegie-Illinois Steel Corporation, a corporation of New Jersey Application May 27, 1944, Serial No. 537,668

6 Claims. (Cl. 189—82)

This invention relates to improvements in gratings of the character employed in bridge floors, over area-ways and the like, and to the method of making the same.

It is a prime object of my invention to provide a simplified method of assembling and connecting a plurality of intersecting grating members to form an integral structure.

A further object is to provide a grating which is fully welded throughout.

Additional objects and advantages will become apparent from the following description taken in connection with the accompanying drawings wherein:

Fig. 1 is an exploded perspective view showing the members of my improved grating prior to assembly;

Fig. 2 is a perspective view of the completed grating of Fig. 1;

Fig. 3 is a fragmentary plan view of two grating members assembled before welding;

Fig. 4 is a sectional view on the line IV—IV of Fig. 3;

Fig. 5 is a view like Fig. 4 showing the welding operation;

Fig. 6 is a sectional view on the line VI—VI of Fig. 5, showing the finished welded connection between the two grating members;

Fig. 7 is a perspective view of a modified form of grating constructed in accordance with my invention;

Fig. 8 is a view like Fig. 4, showing one grating member passing through a second grating member before welding;

Fig. 9 is a sectional view on the line IX—IX of Fig. 8, illustrating the manner of welding the said grating members; and Fig. 10 is a fragmentary perspective view of a modified form of grating member.

Referring to the drawings, the grating of Figs. 1 and 2 comprises a series of parallel primary members 1 and a series of parallel secondary members 2, the said series being arranged at right angles to each other, with the secondary members entered within the upper edges or faces of the primary members. Fig. 7 shows a modified form of grating structure embodying my invention and employing, in addition to the primary members 1 and secondary members 2, a series of tertiary members 3 disposed between the primary members and extending parallel thereto, and a fourth series of members 4 extending parallel to the secondary members 2. As before, the secondary members are entered in the upper edges of the primary members. The tertiary members 3 are entered within the upper edges of the secondary members 2, and the fourth series of members 4 are entered within the upper edges of both the primary and tertiary members. In both types of grating structures, the members define rectangular openings, and preferably have the upper edges of all of said members disposed in the same plane.

My invention contemplates a uniform type of connection which may be employed throughout for welding the respective grating members together. As illustrative of this type of connection, Figs. 3 through 6 show the primary member 1 provided with a cuneiform recess transversely through said member and extending downwardly from the upper face or edge thereof, the taper of said recess converging downwardly and terminating in a rounded bottom or terminal. The secondary member 2 is formed with at least a portion thereof having a transverse section complemental to and fitting the recess 5, except that the vertical depth or width of said portions of the member 2 is slightly greater than the corresponding depth of the recess 5, so that the member 2 extends slightly above the member 1, as indicated at 6, when the secondary member is entered in the said recess.

With the members positioned as in Fig. 4, they are placed between the electrodes 7 and 8 of a flash welding apparatus, having pressure heads or members 9 and 10 respectively, disposed above and below the assembled members 1 and 2. By this means, the members 1 and 2 are flash welded under pressure, whereby the contacting areas of members 1 and 2 are first heated to welding temperature and then the member 2 is lowered to bring the upper edge or face thereof level with that of the primary member 1. The action obtained by the combined heating and displacement, together with the cuneiform disposition of the contact areas between the grating members, results in the production of substantially full area welds throughout said areas with the addition of a slight extrusion of metal at the angles formed by said structural members, forming fillet-like strengthening portions as indicated at 11 in the drawings.

Where design and loading require, the grating may employ additional strengthening members 12 as shown in Fig. 7, the said members extending transversely of and through the primary members 1. For this purpose, I form cuneiform recesses 13 in members 1 at the proper intervals, the said recesses preferably being located below the neutral axes of said members. Members 12 are formed of a complemental cuneiform section but slightly less in depth than recesses 13 to permit initial threading of said members in the aligned recesses. When assembled as in Fig. 8, the members 12 and 1 are flash welded under pressure as before, the upper electrode and pressure head 7, 9 straddling the upper portion of member 1 as indicated in Fig. 9. The same type of connection as shown in Figs. 3 through 6 is thereby produced, with substantially full area welds and strengthening fillet-like extrusions 11.

Instead of employing grating members which are cuneiform in section throughout, those members to be entered within the edges of other members may be of rectangular section and formed with individal cuneiform portions 14, as shown in Fig. 10, a secondary member 2 being illustrated by way of example.

My improved grating may be formed of steel or other electrically-conductive metal, and by preforming the plural series of members with complemental cuneiform cross sections and receiving recesses, the said series of members may be readily assembled and flash welded in the manner described, with economical labor and construction costs.

The cuneiform preformed recesses and complemental sections of the grating members received therein enable the transmission of the welding heat and pressure throughout the contact areas of the joint with sufficient uniformity to obtain substantially full area welds, thus insuring a finished grating of strong and durable construction.

It should be noted that the cuneiform portions of the members to be inserted in and the recesses of the receiving members have a moderate taper with straight sides or faces, capable of readily and firmly seating the entering members upon initial assembly before welding. Such a taper also lends itself readily to the production of a full area weld due to the initial contact between said members. While the taper may vary somewhat, the same is limited in a manner commensurate with the section of the grating members. In other words, it is preferable to have the depth or vertical dimension of the smallest members not less than twice the width or horizontal dimension of said members at the top edge or face thereof, and the resulting taper included between the sides of the cuneiform portion, preferably slightly rounded at the lower edge or terminal, therefore will not exceed such relation.

Various changes and modifications are contemplated within the scope of the following claims.

I claim:

1. The herein described method of making a grating of the character described, consisting in forming one series of electrically-conductive members with cuneiform receiving recesses and a second series of electrically-conductive members with complemental cuneiform portions fitting said recesses when the said series are assembled in intersecting relation, and flash welding the members together at said cuneiform portions under sufficient pressure to displace fillet-like portions outwardly of said members in the angles therebetween.

2. The herein described method of making a grating of the character described, consisting in forming one series of electrically-conductive members with cuneiform receiving recesses having their taper converging inwardly from an outer edge of said members, forming a second series of electrically-conductive members with complemental cuneiform portions fitting said recesses, initially assembling the said series of members in intersecting relation with the cuneiform portions and recesses engaged, and then flash welding the members together at said engaged portions under sufficient pressure to displace fillet-like portions outwardly of said members in the angles therebetween, the cuneiform portions having a depth in the direction of their taper at least twice their maximum width transversely of said taper.

3. The herein described method of making a grating of the character described, consisting in forming one series of electrically-conductive members with cuneiform receiving recesses having their taper converging inwardly from an outer edge of said members, forming a second series of electrically-conductive members of cuneiform section substantially throughout complemental to and fitting said recesses, initially assembling the series of members in intersecting relation by entrance of the second series in the recesses of the first series, and then flash welding the members together at their points of intersection under sufficient pressure to displace fillet-like portions outwardly of said members in the angles therebetween, the second series of members having a depth in the direction of their taper at least twice their maximum width transversely of said taper.

4. The herein described method of making a grating of the character described, consisting in forming one series of electrically-conductive members with cuneiform receiving recesses having their taper converging inwardly from an outer edge of said electrically-conductive members, forming a second series of electrically-conductive members of cuneiform section substantially throughout complemental to and fitting said recesses, initially assembling the series of members in intersecting relation by entrance of the second series in the recesses of the first series, and then flash welding the members together at their points of intersection under sufficient pressure to displace fillet-like portions outwardly of said members in the angles therebetween, the second series of members having a depth in the direction of their taper at least twice their maximum width transversely of said taper.

5. A grating of the character described, including at least two series of members arranged in intersecting relation, the second series of members being entered within the upper edges of the first series of members substantially flush with said edges and being of cuneiform section substantially throughout with the taper thereof converging inwardly from said edges, the intersecting portions of said members being characterized by substantially full area welds and fillet-like extruded portions at the angles between the said members, the second series of members having a depth in the direction of their taper at least twice that of their maximum width transversely of said taper.

6. A grating of the character described, including at least two series of members connected in intersecting relation, the second series of members having portions of cuneiform section entered within the edges of the first series of members substantially flush with said edges, the said portions having a taper converging inwardly from said edges, the connections between said portions and the first series of members being characterized by substantially full area welds and fillet-like extruded portions at the angles between the said members, the said cuneiform portions having a depth in the direction of their taper at least twice the maximum width thereof transversely of said taper.

TAPPAN COLLINS.

REFERENCES CITED

The following references are of record in the file of this patent:

UNITED STATES PATENTS

| Number | Name | Date |
|---|---|---|
| 1,133,806 | Lachman | Mar. 30, 1915 |
| 1,636,592 | Cushwa | July 19, 1927 |
| 1,972,113 | Schulz | Sept. 11, 1934 |
| 2,319,468 | Nagin et al. | May 18, 1943 |